March 27, 1945.  C. B. BREEDLOVE  2,372,545

GUARD OR BAFFLE FOR FUEL TANKS

Filed Nov. 27, 1942

Inventor
Charles B. Breedlove
By Barthel & Bugbee
Attorneys

Patented Mar. 27, 1945

2,372,545

UNITED STATES PATENT OFFICE 2,372,545

GUARD OR BAFFLE FOR FUEL TANKS

Charles B. Breedlove, Romeo, Mich.

Application November 27, 1942, Serial No. 467,102

1 Claim. (Cl. 220—86)

The present invention relates to anti-theft devices and more particularly to a guard or baffle for the filler spouts of gasoline tanks.

The primary object of the invention is to provide a guard or baffle device adapted to be easily and readily positioned in the filler spout of a motor vehicle fuel tank to prevent the insertion of a siphon hose or the like by an unauthorized person and thereby prohibit the theft of the tank contents.

Another object of the invention is to provide a filler spout baffle or guard which is adapted to be compressed prior to its insertion, so that the expansion thereof when in position will retain the baffle in engagement with the interior walls of the filler spout and prevent the same from being removed or displaced.

Another object of the invention is to provide a guard or baffle for the filler spouts of motor vehicle fuel tanks which is formed of a sinusoidal strip of metal coiled upon itself spirally with the convolutions thereof in the same plane so that the spaces between the convolutions will be restricted to prohibit the insertion of a siphon hose but will be adequate to allow the passage of gasoline during the filling operation of the tank.

Another object of the invention is to provide a guard or baffle device which may be strengthened or reinforced by an additional strip of spring material forming a backing for the sinusoidal strip so that when both are spirally coiled together, portions of the convolutions of the sinusoidal strip will lie against the reinforcing strip and will be spaced equidistantly from the adjacent convolutions.

Another object of the invention is to provide a guard or baffle device as above set forth wherein the reinforcing strip is formed as a continuation of the sinusoidal strip and is bent upon itself to extend parallel with the sinusoidal strip so that the easy coiling of the device will be facilitated when placing the guard device in position in a fuel tank filler spout.

Another object of the invention is to provide a guard or baffle device for the filler spouts of motor vehicle fuel tanks which may be secured in place and held by the expansive action of the resilient strip without requiring the use or employment of various fastening devices such as screws, nails or rivets.

Other objects of the invention will become apparent during the course of the following description of the accompanying drawing wherein.

General description of the invention

Figure 2:
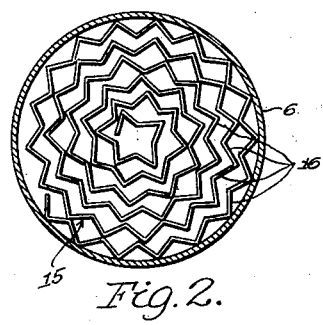
Figure 2 is a diagonal cross-sectional view taken on line 2—2 of Fig. 1 looking in the direction of the arrows illustrating a preferred embodiment of the invention and showing the manner in which the guard is positioned in a fuel tank filler spout.

The invention comprises a guard or baffle device adapted to be inserted in the filler spout of a motor vehicle fuel tank to prevent unauthorized access to the contents of the tank or the theft thereof but yet allow the free passage of fuel into the tank by a fuel station attendant. In general a sinuous strip of resilient metal is wound in a coil with the spiral convolutions in the same plane so that it may be inserted in the fuel tank filler spout in its coiled position. After the coiled strip is thus inserted the expansion of the strip against the inner walls of the filler spout will retain the baffle or guard in position. The sharp corner portions of the sinusoidal strip are adapted to engage the inner wall of the filler spout and bite into the wall so that the spiral baffle will be prevented from being pushed into the fuel tank or withdrawn from the spout. In another embodiment of the invention a relatively straight locking strip is provided to assist in coiling the sinusoidal strip prior to its insertion in the fuel tank filler spout as well as serving to space the convolutions of the sinusoidal strip to cause the sinuous portions to arrange themselves in a more or less orderly fashion when released in the filler spout of the fuel tank and thereby prohibit the insertion of a rubber siphon pipe or the like for the drawing of the fuel therein.

Detailed description of the invention

Figure 3:
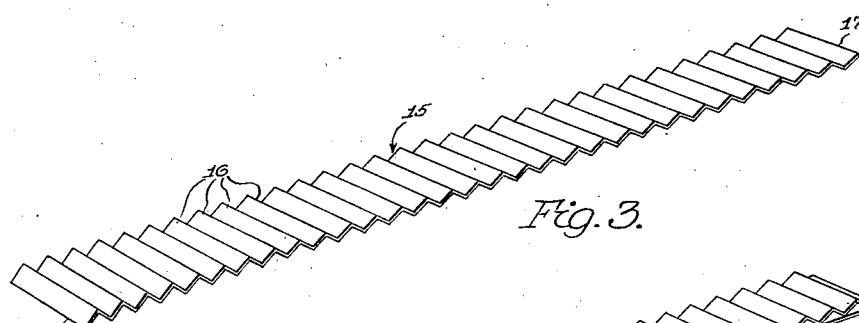
Figure 3 is a perspective view of the baffle or guard device showing the same in an extended position prior to the coiling thereof.
Figure 1:
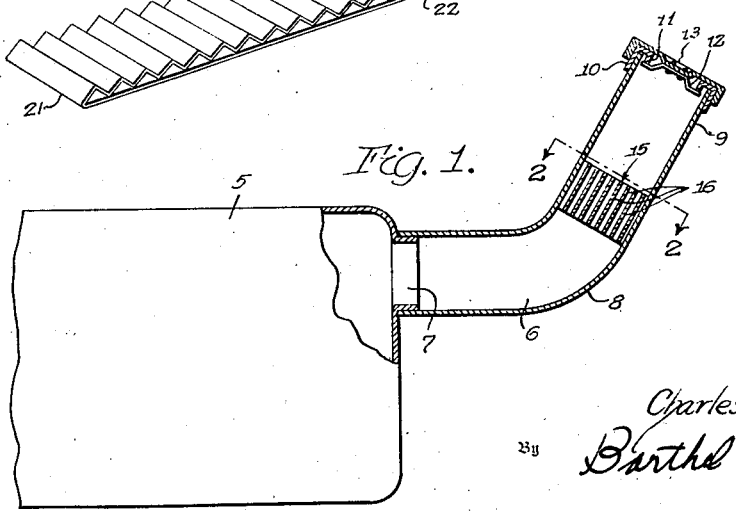
Figure 1 is a side elevational view of a motor vehicle fuel tank showing a portion through the filler spout broken away to illustrate the manner in which the guard or baffle device embodying the invention is held in position.

Attention is first directed to Figures 1 to 3 inclusive wherein there is shown a preferred embodiment of the invention and wherein the reference character 5 will generally be employed to designate a fuel tank of conventional form usually mounted on the rear of a motor vehicle for supplying motive fuel to the vehicle power plant. As usual, a filler spout 6 is secured to an annular flange 7 formed integral on the tank 5 and the filler spout is provided with a gooseneck portion 8 so that the free end 9 may project through the rear apron of the vehicle or through an opening in one of the rear fenders to facilitate access thereto for filling purposes.

The open end of the filler spout is provided with an annular cap retaining ring 10 fitted in place and held by suitable fastening means such as rivets or the like. The inturned flange 11 of the ring 10 is provided with cam surfaces for interlockingly receiving a cross bar 12 secured to the closure cap 13. The filler spout closure structure may be of any well known type and the form shown is merely for the purpose of illustration.

The invention comprises an elongate strip 15 of resilient spring metal having a high degree of flexibility. As shown in Fig. 3, the strip 15 is transversely corrugated as at 16 throughout its length to provide a strip which is sinusoidal in longitudinal cross-section. The strip 15 has one of its ends 17 bent upwardly while the opposite end 18 is bent downwardly in the opposite direction. This is to facilitate easy winding of the strip into spiral form and to prevent the innermost edge from becoming entangled in the corrugations during such winding.

The corrugations 15 are of equal size throughout the length of the strip but if desired, the corrugations may be gradually increased in size toward one end of the strip.

It is intended to wind the strip 15 into spiral form with each convolution in the same plane radially from each other. After the strip is thus wound, it is inserted in the filler spout as shown in Figs. 1 and 2 and allowed to expand into tight engagement with the walls thereof. It is to be noted that the ridges of the corrugations are formed relatively acute so that the end portions will engage the walls of the filler spout 6 and assist in retaining the baffle or guard thus formed in place.

Figure 4:
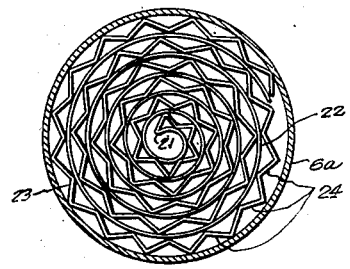
Figure 4 is a cross-sectional view similar to Fig. 2 illustrating a modified form of the invention.
Figure 5:
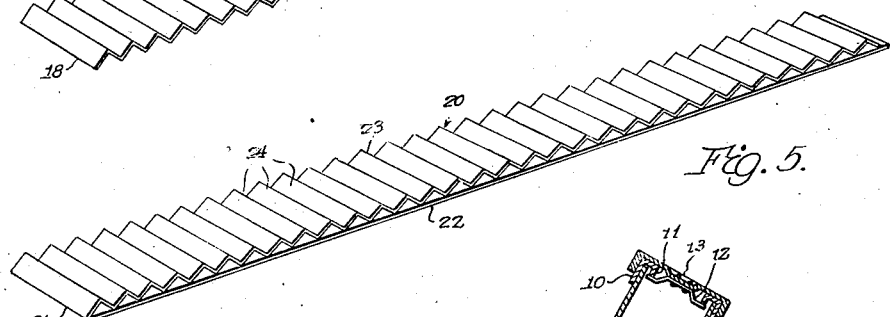
Figure 5 is a perspective view of the guard or baffle device shown in Fig. 4 in its extended or uncoiled position showing in detail the reinforcing or sustaining strip for equidistantly spacing the convolutions of the sinusoidal strip.

In Figs. 4 and 5, there is shown a modified form of the invention and as illustrated in Fig. 5, the guard or baffle device is constructed of an elongate metal strip 20 of resilient springy metal bent upon itself as at 21 to provide coextensive sections 22 and 23. The sections 22 and 23 when bent are of the same length and the section 22 is relatively flat and straight, while the section 23 is transversely corrugated as at 24 to provide a series of undulating portions throughout its length. It is to be noted that the corrugated ridges 24 are formed to provide sharp end portions which will assist in retaining the guard in position in the filler spout of the fuel tank similar to the form of the invention shown in Figs. 1 to 3 inclusive.

When the sections 22 and 23 of the strip 20 are wound in clock spring fashion, to a diameter smaller than the internal diameter of the filler spout 6ª the baffle thus formed may be inserted therein and pushed downwardly to the same position as the baffle shown in Figure 1. The expansive force of the coiled spring strip 20 forces the outermost convolutions into engagement with the filler spout walls under sufficient pressure to prevent the baffle or guard from falling or being pushed into the fuel tank.

The strip 20 may be wound in spiral form with the straight flat strip 22 innermost so that the other corrugated section 23 will have its convolutions spaced equally throughout the coil with the corrugations contacting the convolutions of the flat strip 22. This construction also facilitates the easy winding of the strip 20 prior to its insertion in a fuel tank filler spout.

*Operation of form of the invention shown in Figs. 1 to 3 inclusive*

It will first be assumed, that the corrugated strip 15 is fully extended as shown in Fig. 3. The user simply winds the strip in spiral fashion with the convolutions in the same radial plane until the overall diameter of the coiled strip is less than the diameter of the filler spout opening. The cap 13 is then removed and the coiled strip 15 inserted as shown in Fig. 1, a substantial distance below the retaining ring 10 to prohibit unauthorized persons from tampering with or dislodging the baffle thus formed.

*Operation of the form of the invention in Figs. 4 and 5*

In the operation of the form of the invention in Figs. 4 and 5, the strip 20 is likewise coiled or wound spirally wtih the convolutions of the flat strip 22 interposed between the convolutions of the corrugated section 23. When the strip 20 has been wound to a diameter smaller than the diameter of the fuel tank filler spout for which it is intended it may be inserted to provide a guard or baffle therein directly below the opening of the filler spout which will prevent unauthorized persons from stealing the contents of the tank by inserting a siphon hose in the tank and draining the entire supply of fuel therefrom.

It is to be understood that the forms of the invention herewith shown and described are to be taken as preferred embodiments thereof and that various changes in the shape, size and arrangement of parts may be resorted to without departing from the spirit of the invention, or the scope of the subjoined claim.

What I claim is:

In combination with a fuel tank having a filler spout, a spirally coiled baffle inserted in the filler spout intermediate the ends thereof, said baffle comprising a flexible resilient metal strip having a series of acute corrugated projections thereon for providing minute fuel passageways therebetween when the strip is coiled with the convolutions in the same plane, said projections having relatively sharp pointed end edges to be forced into frictional engagement with the interior wall of said spout by the expansion of said strip, whereby said guard will be wholly supported by said expansive force exerted on said edges.

CHARLES B. BREEDLOVE.